(12) United States Patent
Deetz et al.

(10) Patent No.: US 11,929,088 B2
(45) Date of Patent: Mar. 12, 2024

(54) INPUT/OUTPUT MODE CONTROL FOR AUDIO PROCESSING

(71) Applicant: SYNAPTICS INCORPORATED, San Jose, CA (US)

(72) Inventors: Randall Deetz, Las Vegas, NV (US); Trausti Thormundsson, Irvine, CA (US); Stuart Whitfield Hutson, Austin, TX (US); Thorarinn Vikingur Sveinsson, Irvine, CA (US); Yair Kerner, Kiryat Ono (IL)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/990,559

(22) Filed: May 25, 2018

(65) Prior Publication Data

US 2018/0277133 A1    Sep. 27, 2018

Related U.S. Application Data

(63) Continuation-in-part of application No. 15/356,401, filed on Nov. 18, 2016, now abandoned.

(60) Provisional application No. 62/377,495, filed on Aug. 19, 2016, provisional application No. 62/258,374, filed on Nov. 20, 2015.

(51) Int. Cl.
*G10L 21/0364*     (2013.01)
*G06F 3/16*        (2006.01)
*G10L 15/22*       (2006.01)
*G10L 21/0208*     (2013.01)
*G10L 21/0232*     (2013.01)
*G10L 21/0272*     (2013.01)

(Continued)

(52) U.S. Cl.
CPC .......... *G10L 21/0364* (2013.01); *G06F 3/162* (2013.01); *G10L 21/0208* (2013.01); *G10L 21/0232* (2013.01); *H04M 3/568* (2013.01); *G10L 2015/228* (2013.01); *G10L 15/26* (2013.01); *G10L 21/0272* (2013.01)

(58) Field of Classification Search
CPC ..... G10L 25/30; G10L 25/60; G10L 21/0364; G10L 21/0208; G10L 21/0232; G10L 15/26; G10L 21/0272; G10L 2015/228; G06F 3/162; H04M 3/568
See application file for complete search history.

(56) References Cited

U.S. PATENT DOCUMENTS 8,886,524 B1 * 11/2014 Watanabe ........... G10L 21/0208
                                                      704/225
8,938,394 B1   1/2015  Faaborg et al.
(Continued)

*Primary Examiner* — Linda Wong
(74) *Attorney, Agent, or Firm* — Paradice & Li LLP

(57) ABSTRACT

Systems and methods provide input and output mode control for audio processing on a user device. Audio processing may be configured by monitoring audio activity on a device having at least one microphone and a digital audio processing unit, collecting information from the monitoring of the activity, including an identification of at least one application utilizing audio processing, and determining a context for the audio processing, the context including at least one of a hardware, software, audio signal and/or environmental context. An audio signal processing configuration is determined based on the application and determined context, an associated audio signal processing mode is selected, and an optimized audio signal generated.

13 Claims, 5 Drawing Sheets

(51) Int. Cl.
*H04M 3/56* (2006.01)
*G10L 15/26* (2006.01)

(56) References Cited

U.S. PATENT DOCUMENTS

| | | | |
|---|---|---|---|
| 9,202,469 B1 | 12/2015 | Moorjani et al. | |
| 9,721,568 B1 | 8/2017 | Polansky et al. | |
| 9,747,367 B2 | 8/2017 | Benattar | |
| 10,051,364 B2* | 8/2018 | Kim | H04S 7/30 |
| 11,062,724 B2* | 7/2021 | Des Jardins | G10L 21/0208 |
| 2011/0223893 A1* | 9/2011 | Lau | H04M 3/42382 |
| | | | 455/414.1 |
| 2011/0249073 A1 | 10/2011 | Cranfill et al. | |
| 2013/0301837 A1* | 11/2013 | Kim | H04R 3/005 |
| | | | 381/56 |
| 2015/0301796 A1* | 10/2015 | Visser | G10L 17/22 |
| | | | 715/728 |
| 2015/0379583 A1* | 12/2015 | Balasubramanian | G06Q 30/0257 |
| | | | 705/14.66 |
| 2016/0378747 A1* | 12/2016 | Orr | G10L 15/26 |
| | | | 704/9 |
| 2017/0076749 A1* | 3/2017 | Kanevsky | G10L 25/51 |
| 2017/0358305 A1* | 12/2017 | Kudurshian | G10L 15/30 |

\* cited by examiner

INPUT/OUTPUT MODE CONTROL FOR AUDIO PROCESSING

CROSS-REFERENCE TO RELATED APPLICATIONS

The present application is a continuation-in-part of U.S. patent application Ser. No. 15/356,401, filed Nov. 18, 2016, which claims priority to U.S. provisional patent application No. 62/258,374, filed Nov. 20, 2015, and U.S. provisional patent application No. 62/377,495, filed Aug. 19, 2016, each of which is incorporated by reference as if set forth herein in its entirety.

BACKGROUND

Technical Field

The present disclosure generally relates to electronic processing of audio signals and, more particularly, to controlling and optimizing input and output audio signal processing modes on an end user device such as a tablet, laptop, or mobile phone.

Related Art

Many electronic devices, such as tablets, laptops, and mobile phones, process audio signals on the input side (e.g., the audio signal being captured by one or more microphones) and the output side (e.g., the audio signal being played through one or more loudspeakers or headsets). Users typically control high level audio processing settings through user interfaces provided on the device. For example, a computer may include various drivers and control panels providing a graphical user interface (GUI) allowing the user to configure available audio processing controls.

One drawback with existing audio processing systems is that users may not understand the available configurations or how to control the audio processing for a particular environment and intended use, resulting in an audio processing configuration that does not provide optimal performance. For example, audio control settings optimized for a Voice over IP ("VoIP") call may be different than settings for recording a video, watching media content, or processing voice commands at a crowded location. The optimal audio control settings may also change depending on the hardware in use, for example, different settings may be optimal for playback through internal speakers, headphones or an external audio system.

A user may also be inconvenienced or overwhelmed by the process of continually setting audio controls and may select a single mode that may or may not provide acceptable audio processing across all intended uses for the device. Often, a user may not know how to get to the control panel on the device for controlling the audio mode and, even so, the effect that each control setting has on the audio processing may not be understood by the user. In many cases, a user may simply avoid changing the audio settings and rely on the default settings for the system.

Modern audio signal processing systems include hardware, firmware, and software that have additional modes and settings that are not visible to the user through a control panel interface. Such settings may include system level configurations, signal processing modes, and other setting or modes. These settings and modes may be tuned or optimized for certain hardware, firmware and software, and may be preset by device manufactures and application developers for expected use cases, further limiting a user's ability to optimize audio signal processing.

In view of the foregoing, there is a continued need in the art for solutions to optimize audio signal processing on end user devices.

SUMMARY

The present disclosure provides methods and systems that address various needs in the art for configuring and optimizing audio signal processing. Embodiments of the present disclosure include an analysis of media content, hardware context, software context, audio signal characteristics, environmental context and other context information available to a user device. The determined context is then used to optimize the audio signal processing to produce an optimized audio signal adapted for the current context of the user device.

In various embodiments, audio signal processing may be configured by monitoring audio activity on a device having at least one microphone and a digital audio signal processing unit, collecting information from the monitoring of the activity, including an identification of at least one application utilizing audio signal processing and associated audio media, and determining a context for the audio signal processing. In one embodiment, the context may include at least one context resource having associated metadata. An audio signal processing configuration may be determined based on the identified application and determined context, and an action is performed in real time to change the audio signal processing mode to produce an optimized audio signal. User controls providing additional audio controls may be displayed automatically based on a current application and determined context. System level controls are available to the digital audio signal processing unit and/or software to automatically analyze and apply customizations and optimizations to process the audio signal in accordance with the current context.

In various other embodiments, a system includes an audio input/output system, including an audio driver and an audio codec that interfaces with an audio input device, such as one or more microphones, and an audio output device, such as one or more loudspeakers. An audio processing module provides input and/or output audio processing between the audio input/output system and at least one application. In one embodiment, the audio processing module may include acoustic echo cancellation, target source separation, noise reduction and other audio processing modules operable to receive a first audio signal and perform audio processing operations to produce a second, modified audio signal in accordance with an audio signal processing context. An audio processing control module monitors the audio systems, including context information that is not available to the end user, and may automatically update configuration settings in real time to optimize the audio signal processing.

In one embodiment, the audio processing control module includes an audio monitor, a context controller, and an audio configuration interface. The audio monitor tracks available audio input and output resources and active audio applications, including available hardware, software, and system level settings that are not available to the end user. The context controller utilizes available audio usage data, audio context data, context resources, and current audio signal processing configuration information, and automatically sets a current audio signal processing configuration in real time to optimize the audio signal processing. The audio configuration interface provides the user with an interactive user interface for selecting basic configuration settings to control the audio processing system. Other audio configuration settings are set automatically by the context controller and may include hardware optimizations, software optimizations, settings based on signal analysis, audio signal processing settings, sensor feedback systems and other optimizations.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

The included drawings are for illustrative purposes and serve only to provide examples of possible systems and methods for the disclosed methods and system for providing input and output mode control and context aware audio processing. These drawings in no way limit any changes in form and detail that may be made to that which is disclosed by one skilled in the art without departing from the spirit and scope of this disclosure.

DETAILED DESCRIPTION

The present disclosure provides methods and systems that address needs in the art of for configuring and optimizing audio signal processing. Embodiments of the present disclosure may be contrasted to pre-existing solutions for processing of audio signals that attempt to analyze the content of the audio media that is being played back (e.g., try to determine if the source of the signal is music, speech, or a movie) and alter the playback processing based on the determination of content. These solutions are limited, however, in that they may be restricted to a small number of preset configurations and unable to distinguish between different contexts, such an interview that is being played back or an ongoing VoIP call. These solutions are also limited in that system level audio signal processing configurations may not be available or understandable to an end user and may be preset by device manufactures and application developers for a narrow set of applications and use environments.

Embodiments of the present disclosure include an analysis of media content and context information available from a user device that is used to determine the source and context of the audio signal being processed and for which control and optimization of the audio processing configuration is available to produce an optimized audio signal. Embodiments further include real time analysis of hardware context, application context, audio signal context, environmental context and other context information to configure audio signal processing to receive an audio signal and output an optimized audio signal for the current context.

Figure 1:
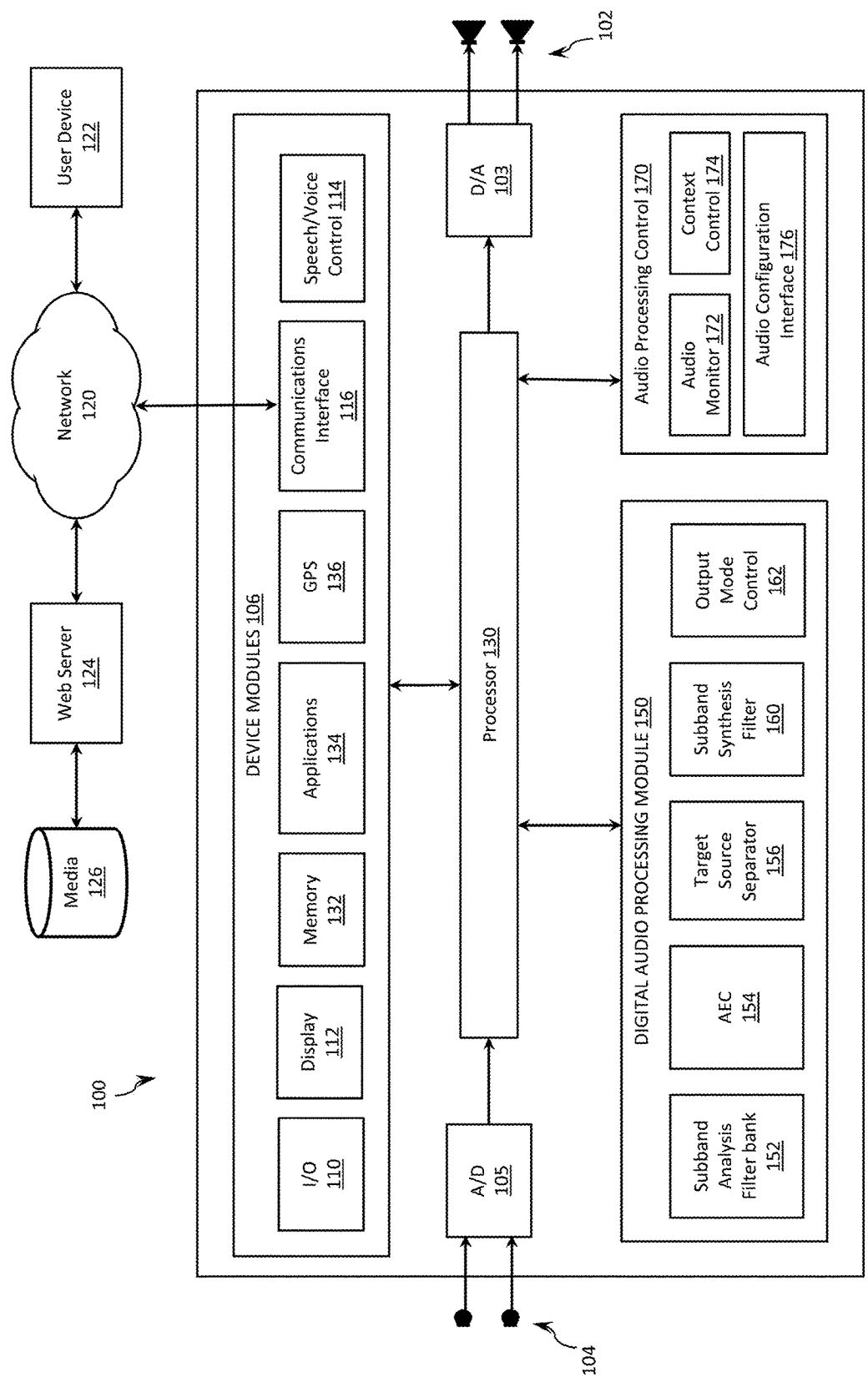
FIG. 1 is a system block diagram of an audio processing system according to one or more embodiments.

Referring to FIG. 1 an embodiment of an exemplary device 100 embodying an audio processing system is described. The device 100 may be implemented as a mobile device, such as smart phone or laptop computer, a television or display monitor, a desktop computer, an automobile, or other device or subsystem of a device that provides audio input and/or output processing. As shown the exemplary device 100 includes at least one audio endpoint device which may include a playback source, such as loudspeakers 102, and at least one audio sensor, such as microphones 104. Analog-to-digital converter 105 is configured to receive audio input from the audio sensor 104. The system may also include a digital-to-audio converter 103 which provides an analog signal to loudspeaker 102. In one embodiment, the ADC 105 and DAC 103 may be provided on a hardware codec that encodes analog signals received from the input sensor 104 into digital audio signals, decodes digital audio signals to analog, and amplifies the analog signals for driving the loudspeaker 102.

Device 100 includes a bus or other communication mechanism for communicating information data, signals, and information between various components of the device 100. Components include device modules 106, providing device operation and functionality. The device modules 106 may include an input/output (I/O) component 110 that processes a user action, such as selecting keys from a keypad/keyboard, or selecting one or more buttons or links. I/O component 110 may also include or interact with an output component, such as a display 112. An optional audio input/output component may also be included to allow use of voice controls for inputting information or controlling the device, such as speech/voice detector and control 114 which receives processed audio signals containing speech, analyzes the received signals, and determines an appropriate action in response thereto.

A communications interface 116 includes a transceiver for transmitting and receiving signals between the device 100 and other devices or networks, such as network 120. In various embodiments, the network 120 may include the internet, a cellular telephone network, and a local area network, providing connection to various network devices, such as a user device 122 or a web server 124 providing access to media 126. In one embodiment, the communications interface 116 includes a wireless communications transceiver for communicating over a wireless network, such as a mobile telephone network or wireless local area network. GPS components 136 are adapted to receive transmissions from global positions satellites for use in identifying a geospatial location of the device 100.

A processor 130, which can be a micro-controller, digital signal processor (DSP), or other processing component, interfaces with the device modules 106 and other components of device 100 to control and facilitate the operation thereof, including controlling communications through communications interface 116, displaying information on a computer screen (e.g., display 112), and receiving and processing input and output from I/O 110.

The device modules 106 may also include a memory 132 (e.g., RAM, a static storage component, disk drive, database, and/or network storage). The device 100 performs specific operations through processor 130 which executes one or more sequences of instructions contained in memory 132.

Logic may be encoded in a computer readable medium, which may refer to any medium that participates in providing instructions to processor 130 for execution. Such a medium may take many forms, including but not limited to, non-volatile media, volatile media, and transmission media. In various implementations, non-volatile media includes optical or magnetic disks, volatile media includes dynamic memory, such as memory 132. Logic for various applications operating on the device 100 may be stored in the memory 132, or in a separate application program memory 134. It will be appreciated that the various components of device 100 may reside in a single device or multiple devices, which may be coupled by a communications link, or be implemented as a combination of hardware and software components.

The device 100 further includes a digital audio processing module 150 which processes audio signals received from the microphones 104 or from other signal sources (e.g., a remote user device or media file) provided to the digital audio processing module 150 by the device 100. In one embodiment, the digital audio processing module 150 includes modules for providing subband noise cancellation, echo cancellation, target source identification, and output mode processing. It will be appreciated by those skilled in the art that other known audio processing modules may also be used. As illustrated, the digital audio processing module 150 includes a subband analysis filter bank 152, an acoustic echo cancellation module 154, a target source detection module 156, a subband synthesis filter 160 and an output mode control module 162.

In one embodiment, the digital audio processing module 150 is implemented as a dedicated digital signal processor DSP. In an alternative embodiment, the digital audio processing module 150 comprises program memory storing program logic associated with each of the components 152 to 160, for instructing the processor 130 to execute the corresponding audio processing algorithms.

In one embodiment, the subband analysis filter bank 152 performs sub-band domain complex-valued decomposition with a variable length sub-band buffering for a non-uniform filter length in each sub-band. The subband analysis filter bank 152 is configured to receive audio data including a target audio signal, and to perform sub-band domain decomposition of the audio data to generate a plurality of buffered outputs. In one implementation the subband analysis filter bank 152 is configured to perform decomposition of the audio data as an undersampled complex valued decomposition using variable length sub-band buffering.

Optional acoustic echo cancellation module 154 removes echo signals from the processed audio signal, such as signals played through loudspeakers 102 and received as interference by microphones 104. In alternative embodiments, the acoustic echo cancellation may be performed after target source identification, at each microphone, or through other configurations as known in the art.

The target source detection module 156 identifies and processes audio for one or more desired target sources. For example, the microphones 104 may pick up sounds from a variety of sources in a crowded restaurant, and the target source of interest may be the user of the device who is providing voice commands to the device, or communicating by voice over the communications interface 116, such as through a telephone call or VoIP call. In alternate embodiments, a target source separator may be implemented as a beam former, independent component analyzer or through other target source identification technology as known in the art. In one embodiment, the audio may be speech or other sounds produced by a human voice and the target source identifier attempts to classify a dominant target source, such as by generating a target presence probability corresponding to the target signal. In an alternate embodiment, the device 100 may be implemented in a conference call setting having a plurality of target speakers to be identified.

In an exemplary embodiment, the target source detector uses blind source separation based on constrained Independent Component Analysis (ICA). The method may perform a dynamic acoustic scene analysis that produces multiple features used to condition the ICA adaptation. The features include estimation of number of acoustic sources, direction of arrival estimation, and classification of sources into interference, speech sources, and various statistical measures. The ICA produces a "deep" spatial representation of the target sources and the noise sources, even in highly reverberant conditions, because reverberation is implicitly modeled in the filtering. In one embodiment, the enhanced signal can be a true stereo output, where spatial information in the desired signal/signals is preserved while removing unwanted signal from both channels.

In one embodiment, the subband synthesis filter 160 receives and processes the target source information and recombines the subbands to produce a time domain output which may be provided to other components of device 100 for further processing.

The output mode control module 162 provides output processing that may include optimizations for the output endpoint devices 102, optimizations depending on audio stream media type, such as movie, speech, music or game, and other output optimizations. In various embodiments an output signal may be analyzed in real time to determine the appropriate output processing mode. For example, a media file may be downloaded or streamed from an Internet server along with media information categorizing or otherwise describing the content. In operation, the output mode control module 162 may process the output audio signal in a mode indicated by media information, while analyzing the content to adaptively switch between output processing modes depending on the detected content (e.g., switch between speech, music, and movie modes).

The audio processing system further includes an audio processing control module 170, which may be implemented, for example, as program logic stored in memory 132 or 134, and executed by processor 130. In one embodiment, the audio processing control 170 includes an audio monitor 172 and a context controller 174 that are run as background applications on device 100, and an audio configuration interface 176.

Figure 2:
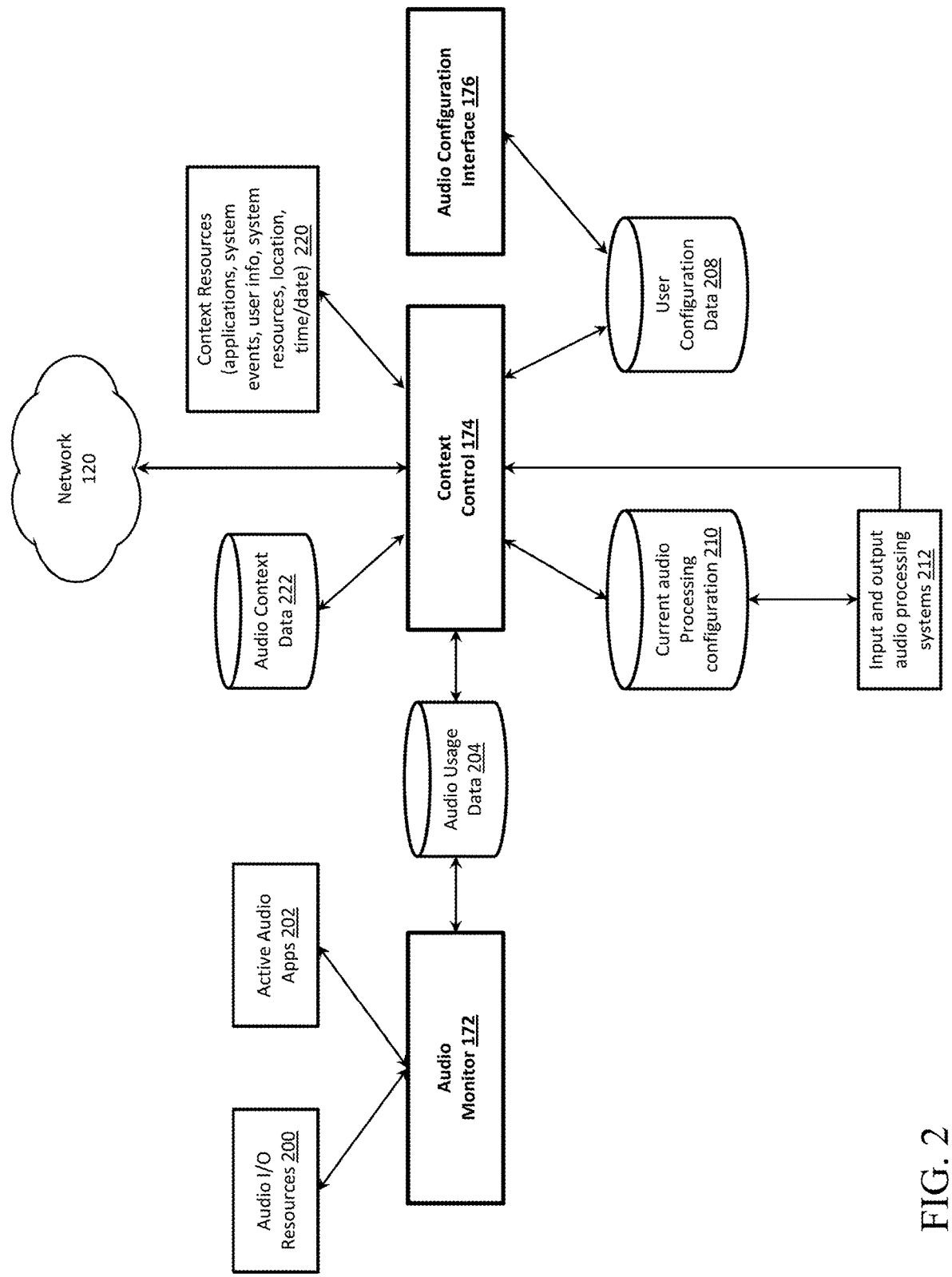
FIG. 2 is a block diagram of illustrating an embodiment of the audio processing control in accordance with one or more embodiments.

An embodiment of the operation of the audio processing control module 170 is illustrated in FIG. 2 and will be described with reference to the device 100 illustrated in FIG. 1. The audio monitor 172 may be implemented as program running in the background on the device 100 to monitor the use and processing of audio input and output resources 200 (such as microphones 104, loudspeakers 102, and communications interface 116), and system applications 202 that access the audio resources 200. The audio monitor 172 stores current audio usage data 204, including identification of the audio resources 200 utilized by associated audio applications 202. In one embodiment, the audio monitor 172 tracks in real time the applications that are using each available resource—for example, by monitoring active tabs or windows on a laptop operating system—and stores the real time information in the audio usage data storage 204.

The audio configuration interface 176 provides the user with an interactive user interface for configuring the audio processing system, which may include user selectable input processing modes such as beam forming, telephone conference, echo cancellation and voice-over-IP communications, and output processing options such as speech, music, and movie modes. The audio configuration interface 176 may also include a user-selectable option for activating and deactivating the audio monitor 172 and context controller 174. The user configuration information is stored in user configuration data storage 208. The context controller 174 monitors the audio usage data 204 and selects an appropriate audio processing configuration 210 for the input and output audio processing systems 212.

In one embodiment, the context controller 174 tracks context resources 220 associated with the audio usage data 204, evaluates a current context for the use of the resource and stores associated audio context data 222, which may be used in real-time or stored for later use. The context resources 220 may include location resources (e.g., GPS location, local network system, identification of location for event on calendar), appointment information (e.g., conference call, participants), available resources (e.g., microphone array, location of microphones, external microphone/speakers), date and time (e.g., weekend, late night), media type, metadata and other sources identifying the expected usage of the device. The context controller 174 matches audio usage data 204 and user configuration data 208 to an associated context and stores context information in the audio context data storage 222.

In various embodiments, the context controller 174 facilitates automated, real-time optimization of audio signal processing, including optimization of user audio settings (such as settings that may be available through an audio configuration interface 176) and system level optimizations based on hardware, software, audio signal, environmental and other contexts as described herein. It will be appreciated that the present disclosure provides audio signal processing optimizations that are not available to users in conventional systems, for example, by automatically analyzing and applying, through a context controller, context information in real time based on changes to a hardware context, software context, audio signal context or environmental context.

Embodiments of the present disclosure facilitate additional context-based optimizations that are not available in conventional systems. For example, the content of audio media may be analyzed in real time to switch an audio processing context based on a detected content. As another example, a movie may include music and the context controller may detect the music context and seamlessly switch modes between movie and music in real time to optimize the user experience. Metadata associated with the content may also be analyzed the system further inform the context control 174 of appropriate optimizations.

In one embodiment, the context controller 174 tracks applications running on the device and sets the current audio processing configuration 210 in accordance with the user configuration data 208 and audio context data 222. For example, the audio processing system may be implemented in a mobile phone that may be used for a standard phone call, a speaker phone call, a video conference call and for recording videos. Each usage, and each context of usage, may have different configuration parameters.

Some applications operate with application specific audio signal assumptions which may not be consistent with a current audio processing mode and environment. In various embodiments, application context is detected by the system and known or detected application specific audio signal processing algorithms and requirements are analyzed to optimize the device audio signal processing for the application. For example, a plurality of applications may each include its own audio signal processing algorithm and the audio signal processing context may change in real time to maintain optimized audio signal processing as the user switches between applications. It would be impractical for a user to reconfigure the device's audio signal processing settings every time an application is selected. Further, such settings may be directed to lower level audio signal processing settings that are not visible to or known by the end user. Thus, the context controller 174 is operable to track applications and behaviors and optimize the audio signal processing settings as each application is selected.

The input and output audio processing systems 212 may provide additional feedback to the context controller 174 that may be stored in the audio context data 222 such as vocal parameters of a received target, noise parameters, and other information that may be used by the audio processor in a given context. The context controller 174 may also receive real-time context information from network 120 (such as the Internet) for a particular location or event (e.g., a concert), allowing the audio processing configuration to be adapted based on information received from other user devices.

In various embodiments, the system tracks available input and output endpoint devices and analyzes feedback from these devices to provide further context information for use in analyzing the system configuration and environment. For example, the context controller 174 may maintain information about various end point devices and track which ones are in use. Analysis of sensor signals and other data can provide additional context characteristics for the system that are not available to user. Tracked characteristics may include, for example, a type of end point (headphones vs. external speaker) and location of each end point, which may be used to optimize DSP settings in real time for the end point. The DSP settings are optimized for the detected hardware, software, media and environmental contexts. Other context information may include excursion of the speaker/amplifier (temperature excursion of speakers), reflectivity of the room, and a calculated noise floor received from the microphone, for example. Other sensors may include an imaging sensor which may be used to identify the location of a user in a field of view of the imaging sensor and detect the user's intent to address the device, for example.

In some embodiments, the number of people and/or unique voices in a room may be analyzed through one or more audio input signals received at one or more microphones. In one embodiment, the other voices, noises and echoes may be filtered out leaving the desired speech signal as an output. In some embodiments, a user walking with mobile device may move between environments, with each environment being detected by microphones and/or other sensors (e.g., moving from indoors to outdoors, or between quiet and noisy environments). The change in environmental context may lead to a change in audio signal processing both on the input side to capture desired speech and output side to optimize listenability, while not disturbing the environment. It will be appreciated that audio signal processing optimizations based on analysis of the environment allows for real time changes to address environmental changes (e.g., a train roaring by, a dog barking). Such changes may be based on signal properties and system level data that are relevant to an operation of an audio signal processor.

In some embodiments, the target source separation module and other audio input processing modules may be operable to determine a direction of a target user, number of targets, and other environmental information that may be analyzed in combination with the active application and other data to optimize the audio settings, such as by changing a target source processing mode. For example, an input signal may be provided to a target separation module to separate out a target source in a conference call setting. The context controller may direct use of other hardware and audio signal processing modes to optimize the signal and/or target source separation based on the detected context, such as switching to a single user mode.

Additional sensor feedback information may include noise floor calculations received from one or more microphones. In a noisy room, the noise floor may indicate a need to turn up the volume of the loudspeakers if an external speaker is used for output but, depending on the context, may not affect processing for a headset. Using context information received through signal process characteristics (such as noise floor) system resources in use at a given time can be further optimized. Hardware configurations may include lower power DSP, low power mode, headphone path, internal speaker path, captive microphone path and other context information.

It will be appreciated that the audio monitor 172, context controller 174 and audio configuration interface 176 may be combined or otherwise arranged as one or more software, firmware or hardware modules. In one embodiment, the context controller 174 tracks and configures audio activity in real time, for example, by detecting a received audio signal, identifying an associated application and determining the context configuration, without use of a separate audio monitor 172 or audio usage data 204.

In an exemplary embodiment, a mobile phone user may launch a video conference application, in which the user holds the phone at a distance that allows for viewing of the incoming video and capture of the user on the mobile phone camera. The appropriate audio settings for the video conference may depend on the context of use. If, for example, the context controller identifies the user location at an airport (e.g., by using GPS data), a setting that targets the user's voice while removing other noise sources could be used. If the user was at home with family on a video conference with a relative, it may be desirable to maintain other voices and received audio signals. Further, the audio playback settings could be optimized for speech.

In some embodiments, a video call (e.g., a Skype call) or VoIP call may process audio in a first mode to condition speech for human hearing. During the call the user may initiate a voice command by vocalizing a trigger word. While processing the input audio signal for the call, the audio processing module may detect the trigger word and initiate an audio signal processing mode optimized for automatic speech recognition (ASR). For example, the audio signal processing configuration may be modified by the context controller to address the signal processing issues in handling two different types of data simultaneously. For ASR, the audio signal processing may include isolating a particular speech signal and removing the noise to produce an audio signal optimized for input to an artificial intelligence engine. For VoIP, the audio input signal may be processed for human hearing.

In various embodiments, the audio signal processor can switch between the two modes or initiate a separate audio processing stream in parallel to generate speech optimized for ASR. In some embodiments, a device may enter a low power audio processing mode until a change in context dictates a new configuration. For example, a voice interaction device may operate in a low power mode until a trigger word is detected. The detection of the trigger word provides context information which is analyzed and the context controller may then change the audio signal processing configuration to optimize the audio input signal for speech recognition. In many systems, such audio signal processing configuration changes could occur in the background, providing the user with a seamless device experience that processes both the call and the voice command.

The present disclosure includes embodiments analyzing various context information to determine what type of audio signal processing to perform and what properties of an audio signal are desired in a processed audio signal. To provide the best performance for the user, automated context-based audio processing optimization may be provided as disclosed herein. For example, a VoIP application may create a different context that may include echo cancellation, voice target/direction, processing the input audio for transmission to another device, and an automatic speech recognition system or other processing operation requiring the signal in a certain data format for additional processing. In various embodiments, the context may change based on detected content in the audio signal (e.g., a trigger word), activation of an application on the device (e.g., a VoIP application, a video player application, voice interaction application) which may lead to real-time changes and adaptations to the audio processing context.

The audio context data 222 may include any information that may inform a user to adjust audio settings or the system to modify the audio processing context. For example, context information may include identification of an ongoing VoIP call, a user joining a VoIP meeting, identification of who is participating in a VoIP meeting, location of a meeting (such as a conference room), identification of current speaker, and whether an application is currently playing a media file.

In one embodiment, the information collected by the context controller 174 is processed by a decision map that determines if the current audio processing parameters should be updated. Exemplary actions that may be taken by the context controller 174 can include:

1) Switching Input and Output Processing to Conference Mode.

In one exemplary embodiment, a laptop user joins a scheduled VoIP meeting he created that is set in a conference room. The audio monitor 172 and context controller 174 may identify when a user joins a VoIP meeting, for example, by adding an event handler on joining VoIP calls through appropriate a software development environment. A VoIP call may be associated with a calendar appointment through a calendar application (such as Microsoft Outlook), and the context controller 174 may identify the context of the VoIP call by searching calendar information for a matching meeting appointment. The meeting appointment may include the identity of other people attending the meeting, the meeting location (e.g., conference room), and other information useful for setting audio processing parameters. In operation, the user joins the VoIP call, which is identified by the audio monitor 172 and stored in the audio usage data 204. Context controller 174 identifies whether the user owns the call and if there is an associated appointment. If the appointment is located in a conference room, the context controller 174 changes the current audio processing configuration 210 to conference mode.

The context controller may also track end-point devices and signal properties. For example, one or more co-located endpoint devices, each having a microphone/speaker, may be located within a conference call setting. In some systems, two speaker/microphone devices present in the same room on the same call, can produce feedback that interferes with the conference call. In some embodiments, the input audio signal may be analyzed to detect a feedback signal and the context controller may determine that there is a feedback loop and modify the signal of the device to break the feedback loop, such as be optimizing the audio signal processing by applying an equalization filter, changing the volume, muting a microphone, providing a delay or other appropriate measure.

In one embodiment, the context controller will detect a feedback loop by receiving the input audio signal from the microphone and analyzing the input audio signal to detect a feedback signature in the input data stream, and modify the settings to avoid further feedback. In the VoIP scenario, the system may first look for speaker and microphone enabled devices co-located in the same room and detect the hardware being used (transmission and reception of audio signals in the air as opposed to in a headphone). The system then detects a feedback loop by looking for a feedback signature in the input audio signal. The available solutions may include detecting a number of devices and/or target sources in the room, detecting a context based on an analysis of an input signal and automatically modifying the audio processing in view of the feedback to remove the feedback. The detection of feedback and solution to address the feedback may be resolved in real time, with minimal interference with the audio processing.

In some embodiments, actions to resolve the feedback may include a progressive adaptive approach that includes analyzing the frequency of the feedback signature, reducing gain or removing the resonance peak in a frequency range of the feedback signal, muting one or more of the local microphones that is capturing the feedback signal and proceeding with the call on the other microphone (after detecting that the other microphone is suitable to pick up both voices). In many cases, muting a microphone is not necessary and the problem may be resolved by removing the extra gain and reduce the frequency resonance peak.

2) Deciding when to Display User Controls, and What Applications to Follow.

By monitoring which applications are running and which application is in focus (i.e., in the foreground), including what is visible in the application (such as a conversation window), the audio configuration interface 176 can be launched at appropriate times and locations for the user.

The information may be available to the audio monitor 172 by querying the operating system and storing the information in audio usage data 204. Context controller 174 may identify when an application is running, whether it is in the foreground, and whether a conversation window is open. For certain applications, an active conversation window may activate the launch of the audio configuration interface 176, providing configuration controls for the user. The context controller 174 tracks configuration changes for the current application and context and stores the information at audio context data 222, which may be used as a default configuration when the application is launched in the same or similar context.

3) Conference Virtualization.

Using context control information, the system may know how many people are on a VoIP call, and which user is speaking, This information may be used to virtually position each person so that when they speak the audio appears to come from their virtual position.

4) Configuring Playback Processing.

By storing audio context data 222 associated with context and user configuration data 208, the user preferences for each application can be used to identify the content associated with each application and use that information to configure playback processing for that application.

In an exemplary embodiment, the user opens a music playback application and launches a song. The context controller 174 accesses the audio context data 222 to determine that the music application is used for playing music and changes the current audio processing configuration to change the playback processing to a mode appropriate for music. In various embodiments, the audio content data 222 for an application may be a default configuration for an application, a user selected configuration, or a context based configuration. If the user closes the music application and opens a voice chat application, the context controller 174 will search for a matching configuration. In one embodiment, if the context controller cannot determine that a particular application is, for example, a voice chat application, the context controller 174 can launch the audio configuration interface 176 to ask the user (e.g., with a simple GUI) to identify a context in which the application is used. The context controller 174 stores the information in the audio context data 222 for future use and changes the playback processing appropriately.

In one embodiment, an application may be associated with more than one type of content, such as media players, and the content cannot be determined solely by looking at the application. The context controller 174 may evaluate the files the application has open (has a lock on), to determine what type of content is currently playing (e.g., by checking the file extension). For example, some file extensions may indicate the media is a movie and that a movie mode should be selected. Internet video may have a content type available for download as metadata and the system may include a database to map the content type to an appropriate audio processing mode. The audio signal processing configuration may be further modified based on other context information. Other data may include hardware used, room characteristics (e.g., obtained by pinging the room using system microphones and speakers), and a noise floor level. After a mode is determined, the media stream will continue to be analyzed during playback to determine changes in context.

In one or more embodiments, end point devices may be playing music in a noisy room. The context controller 174 may track the noise floor of the room, acoustic properties of the room, location of end points and other context information to optimize the listening experience for people in the room. In one embodiment, a user may issue a voice command to the device, and the music may make it difficult to pick up the voice command. The context controller 174 may then optimize the environment to receive the voice command, e.g., by pausing music if speech detected in the room. Other optimizations may include lowering the volume of the music, identifying a speaker to turn off to optimize reception at a microphone, determining a location of the microphone, processing input using a microphone array, etc. In some embodiments, the system may proactively direct the input to a microphone closer to the user and direct the output away from the microphone at issue. Other optimizations may include turning down one speaker that is a primary source of the interference, for example.

5) Making Advanced Recordings of VoIP Calls.

The context controller 174 may be configured to interact with active applications to configure audio processing through application controls. For example, the context controller 174 can communicate with both the audio signal processing system and with, for example, a VoIP application.

In one embodiment, the context controller 174 sends a request to the VoIP application to record far end and near end signals separately into files, or as separate channels in the same file. Alternatively, the context controller 174 can request the VoIP application or the audio signal processing system to stream a copy of the far end and near end signals, allowing the background application to perform such recording into files. If the streaming is handled by the audio signal processing components, it can be implemented, for example, through a virtual recording-endpoint, and it can tap the signals after compensation for relative delays between the playback and capture paths. The files can be stored on the local device or on another device, e.g. through Bluetooth.

In another embodiment, the near and far end signals are recorded into a mix of the two signals (e.g., by a weighted sum of the signals). If the streaming is done from the audio signal processing components, the mixing can be done by the DSP it rather than at the background application, so the mix is streamed out to the application.

In another embodiment, the context controller 174 sends a request to the audio signal processing components to add spatial dimension to the captured audio and/or playback (e.g. by providing the signal processing components with an angle (direction) based on who is talking). The audio signal processing components may then change the relative phase and amplitude between left and right channels to deliver a psycho-acoustic effect of changing direction. The context controller may set the angle according (for example) to: (i) which person is talking, by querying information from the VoIP application; (ii) which person is talking, by extracting biometrics to decide between persons that are talking; or (iii) through other context-based information.

In various embodiments, the context controller 174 may be used to attach metadata to the recording files, e.g. start-time and duration of the call, names of all participants, the name of the person speaking at each section, perform further offline batch processing of the recording to prepare it for speech recognition, e.g. non real-time algorithms for removal of undesired sounds (e.g. heavy, or non-causal, or involving a large delay), or algorithms for segmentation of the signal, or algorithms that are degrade the quality for human listening but improve quality for speech recognition engine, or send the recording to a speech recognition engine to get dictation results.

Figure 3:
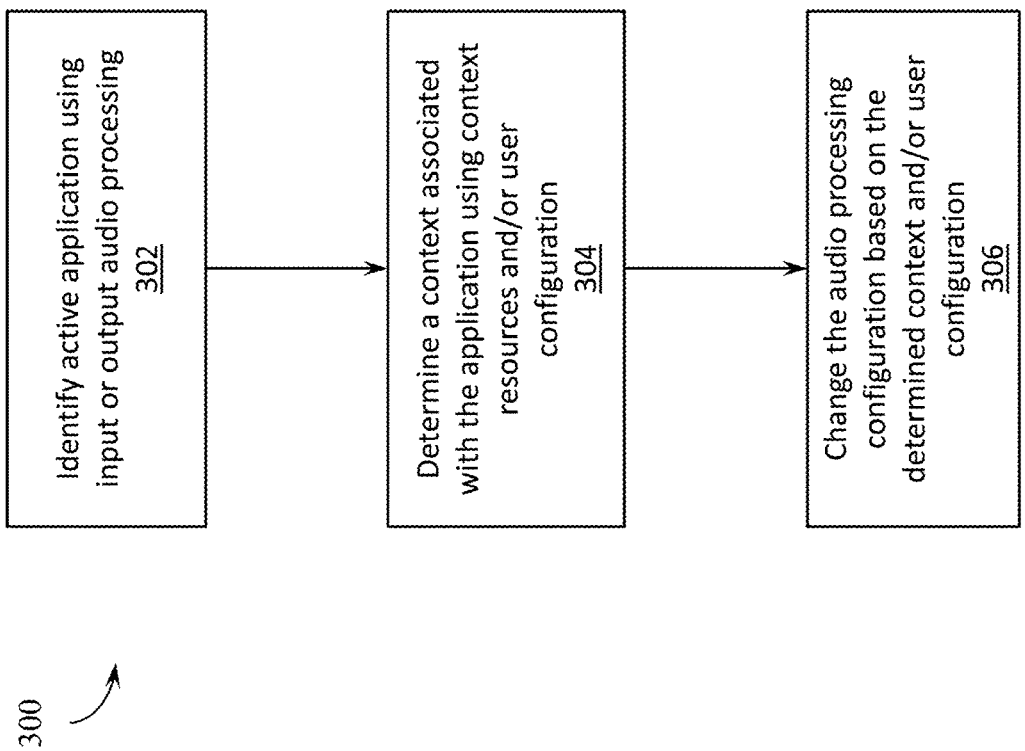
FIG. 3 is a flow chart of a method for context aware control and configuration of audio processing performed by a device in accordance with one ore more embodiments.

FIG. 3 is an embodiment of a flow chart of a method for context aware control and configuration of audio processing performed by a device. A method 300 for context aware control and configuration of audio processing includes identifying an active application using input or output processing (step 302), determining a context associated with the application using context resources and/or user configuration (step 304), and changing the audio processing configuration based on the determined context and/or user configuration (step 306). In various embodiments, the step of identifying 302 may include running a background application to monitor activities processed by the device and collecting application and audio resource information, including information on active applications using the audio processing resources.

The step of determining (step 304) may include, in various embodiments, using a decision map to determine if automated action should be performed, including updating a configuration of the audio processing system. In step of changing (step 306), the audio processing system may be updated, in various embodiments, by automatically switching input and output processing to conference mode, deciding when to display user controls, providing conference virtualization, automatically or manually changing playback processing based on a user configuration for each application.

Figure 4:
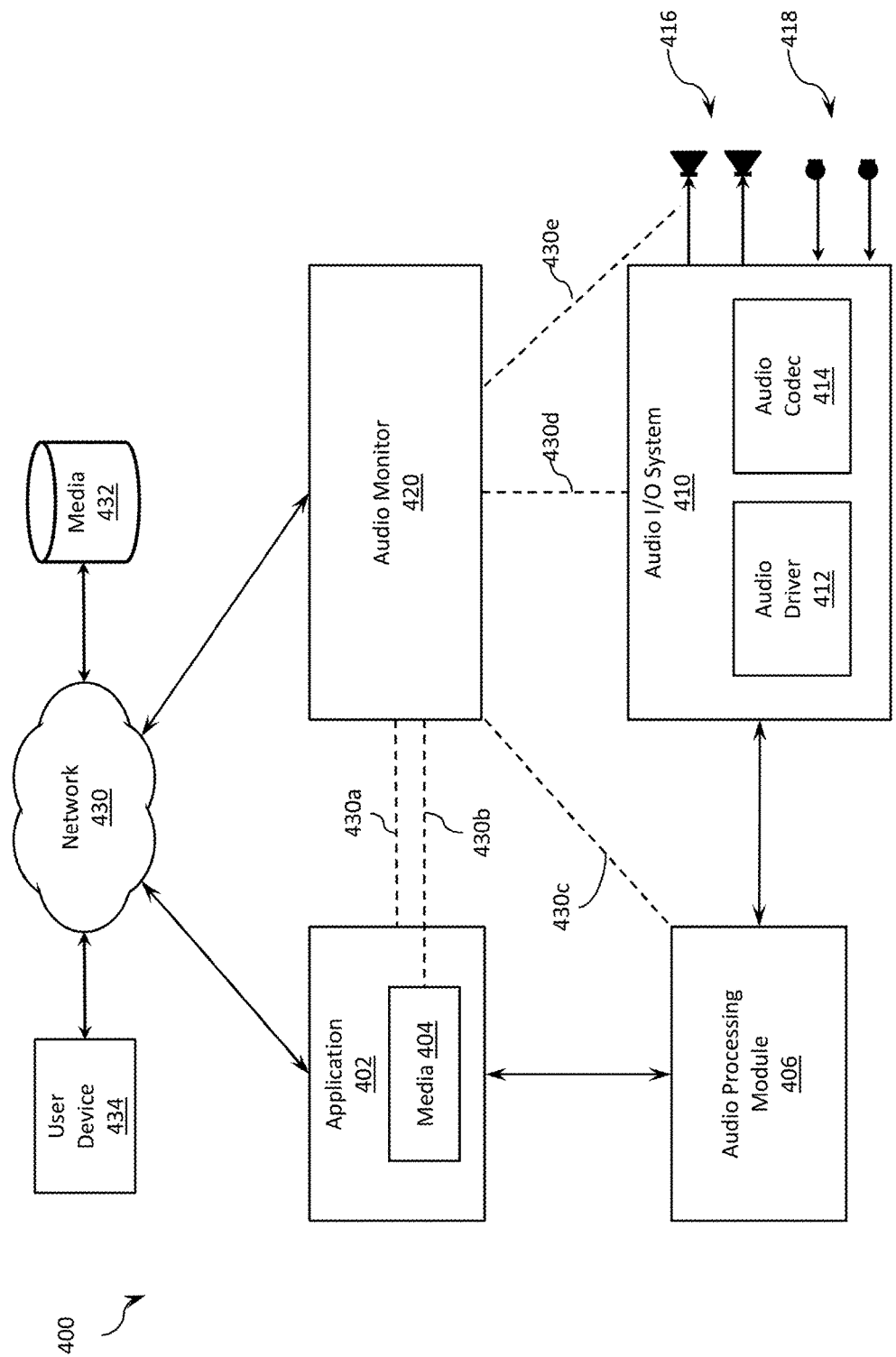
FIG. 4 is a block diagram of an audio processing system in accordance with one or more embodiments.

An exemplary embodiment of automatic output mode switching will now be described with reference to the system 400 illustrated in FIG. 4. The system 400 includes an application 402 that utilizes audio media 404 for output to an endpoint device, such as loudspeakers 416. The application 402 may include a web application, a video player, a VoIP communications application, or other application that generates or receives audio media. The audio media 404 may include real time audio data received from one or more input endpoint devices, such as device microphones 418, received from another device 434 across a network such as a mobile telephone during a wireless telephone call. The audio media 404 may also include media files retrieved from local storage, network storage 432 such as cloud storage, a website or Internet server, or other locations.

The system 400 includes an audio input/output system 410 comprising a combination of hardware and software for receiving audio signals from the one or more microphones 418 and driving the playback of audio signals through the one or more loudspeakers 416. As illustrated the audio I/O system 410 includes a hardware codec 414 for interfacing between the system 400 hardware and audio input/output devices, including digitizing analog input signals and converting digital audio signals to analog output signals. The audio I/O system 410 further includes audio driver software 412 providing the system 400 with an interface to control the audio hardware devices. An audio processing object (APO) 406 provides digital audio input and output processing of audio signal streams between the application 402 and the audio I/O system 410. An APO may provide audio effect such as graphics equalization, acoustic echo cancellation, noise reduction, and automatic gain control.

In operation, the system 400 may run a plurality of applications 402 that interface with one or more APOs 406 to provide audio processing for one or more audio input or output devices 418/416. For example, the system 400 may comprise a laptop computer running multiple applications 402 such as web browsers, media applications and communications applications, such as VoIP communications. The audio I/O system 410 may also comprise various input or output devices 418/416, for example a laptop speaker may be used for audio playback, a user may have external loudspeakers or use headphones. In an exemplary operation, a user may seamlessly switch between applications, media sources (including sources having different media types) and audio I/O devices during operation.

In some embodiments, for example, the user may switch output hardware while playing media, such as by plugging in a set of headphones when listening through a loudspeaker. Adding headphones or other input/output device creates different context assumptions on both the input and output side that the user may not be aware of. The audio processing system knows the endpoints and knows the difference between the endpoints with respect to audio processing. For example, a movie/music mode may have been selected for output processing, but the context controller continues to analyze the context information (e.g., environmental information) and will detect the headphones. If the current context includes ambient noise, the context controller may adapt the output processing through an external speaker to compensate for the noise (e.g., increasing sound levels, changing equalizer settings, etc.). The audio processing setting may change with the headphones because the headphones may block environmental noise so the settings for the loudspeaker can be removed.

An active audio session may include one or more audio streams communicating between applications 402 and audio endpoint devices 418/416, with audio effects provided by the audio processing module 406. In a conventional operation, the audio processing module 406 operates in a default mode or user configured mode that is used by all applications and media. For example, a user may select a music playback mode that is then used by all applications and media, including movies and VoIP calls.

In accordance with the illustrated embodiment, an audio monitor 420 is provided on the system to monitor and configure the audio processing in real time. In one embodiment, the audio monitor 420 runs in the background and does not require interaction or attention from a user of the system, but may include a user interface allowing for configuration of user control and preferences. As illustrated, the audio monitor 420 may track active applications and audio sessions 430a, media types 430b, capabilities of current audio processing module 430c, user configuration and system configurations of audio hardware and software 430d and audio endpoint devices 430e. The audio monitor 420 tracks audio system configuration and usage and adjusts audio settings to optimize the playback settings.

In one embodiment, the audio monitor 420 determines the media type and configures the audio processing module 406 to an available audio mode matching the determined media type. For example, configurations for audio playback type may include movie, music, game and voice playback modes. One or more applications may actively provide audio streams to an end point device. The audio monitor 420 identifies the media 404 playing in an active audio session and analyzes the media type. In one embodiment, the media 404 is retrieved from a network 430 and played via the application 402 (e.g., a video played on a website or audio media played through a mobile phone app). The audio monitor 420 identifies the media source and retrieves information about the online media 432 to determine media type information. For example, the audio monitor 420 may access an online video and download associated metadata and website information, which may include a media category and filetype. The audio monitor 420 may also request information, as available, from an associated online app or webpage. In another embodiment, the media 404 may be a local file and retrieved locally by the audio monitor 420.

The audio processing module 406 includes various playback effects that may be configured by the user or implemented through known media types. In one embodiment, the audio processing module is a Windows APO. The audio monitor 420 identifies media playback options available in the active audio processing module and automatically configures the audio processing module 406 for optimal playback.

In another exemplary embodiment, the application 402 is a VoIP call (e.g., a Skype call) providing both input and output audio processing. The audio input stream may be received from microphones 418 and an output stream may be received another user device 434 across the network 430 for playback on loudspeakers 416. The audio monitor 420 can configure the audio processing module for acoustic echo cancellation, noise reduction, blind source separation of target source, playback mode, and other digital audio processing effects depending on the detected configuration. For example, the system 400 may be playing music out the loudspeaker resulting in an echo received through the microphones 418.

Figure 5:
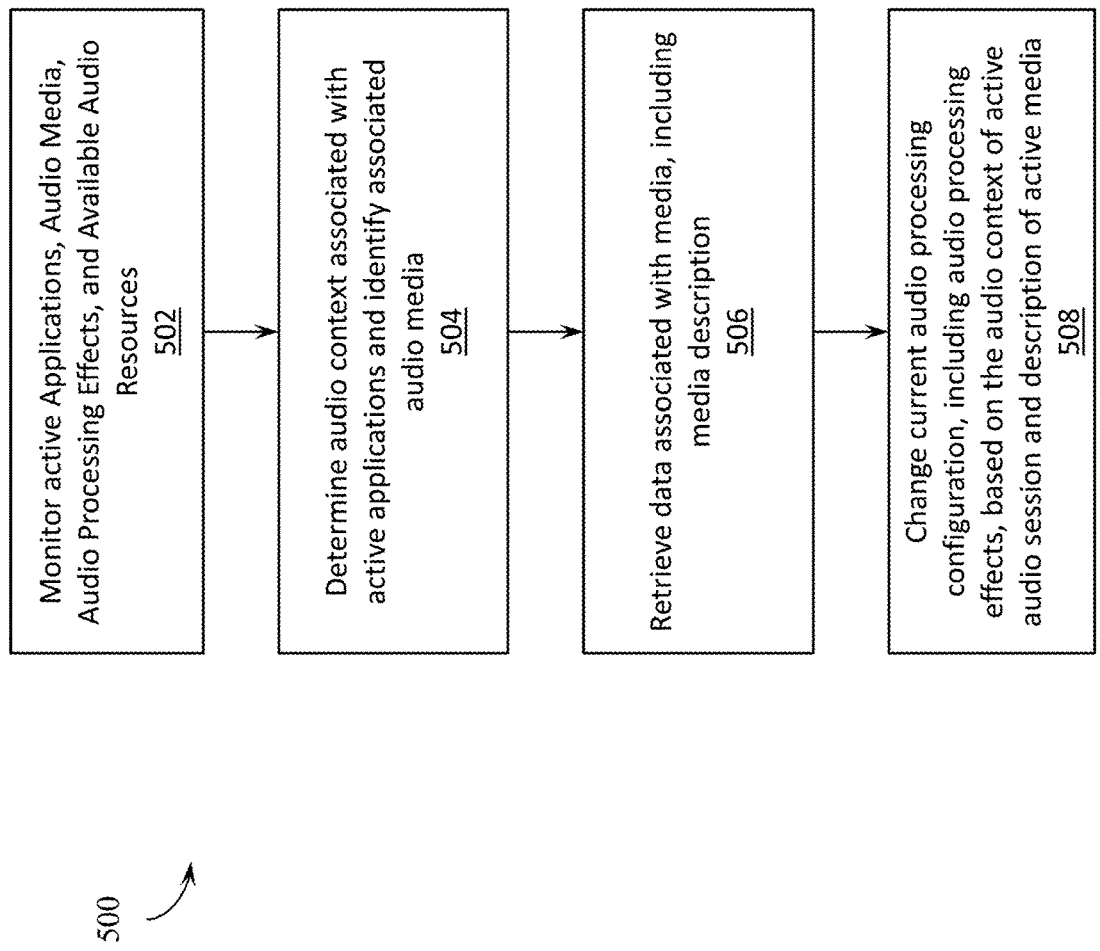
FIG. 5 is a flow chart of a method for context aware control and configuration of audio output processing performed by a device in accordance with one or more embodiments.

Referring to FIG. 5, an exemplary computer implemented process 500 for configuring audio playback settings will now be described. In step 502, an audio monitor application monitors active applications, audio media, audio processing effects and available audio resources. In one embodiment, the audio monitor application regularly polls the system (e.g., every 5 seconds) for active audio sessions. In step 504, the audio monitor application determines a current audio context associated with active application and audio sessions, including identifying associated audio media. In one embodiment, the audio monitor maintains information on active sessions such as associated applications and media information (e.g., media file name, HTTP link). In step 506, the audio monitor retrieves data associated with the identified media, including a media description which may be obtained through file metadata, the associated application, the file location, web domain, link and related information from web page. For example, a local media file may include an extension indicating a file type (e.g., .mp4, .avi, .mov) and file metadata indicating media type (speech, movie, game) and genre information. In step 508, the audio monitor modifies a current audio processing configuration, including audio processing effects, based on the audio context of active audio session and description of active media. In one embodiment, the audio monitor determines available audio output processing and audio output modes available through the active audio processing module and configures the audio processing module to optimize the output processing, for example, by selecting a movie, music, voice or game output mode.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of audio signal processing performed by an audio playback device, comprising:
receiving a first audio signal from a first audio source and a second audio signal from a second audio source, wherein the second audio source is included in the audio playback device and the first audio source is separate from the audio playback device;
determining a plurality of first audio processing operations associated with the first audio signal based at least in part on a first audio application configured to transmit the first audio signal;
determining a plurality of second audio processing operations associated with the second audio signal based at least in part on a second audio application configured to transmit the second audio signal, wherein the plurality of second audio processing operations is different than the plurality of first audio processing operations;
determining a geospatial location of the audio playback device;
modifying the second audio signal based on the plurality of first audio processing operations and the plurality of second audio processing operations; and
modifying the first audio signal, concurrently with the second audio signal, based at least in part on the plurality of first audio processing operations and the determined geospatial location of the audio playback device, wherein modifying the first audio signal comprises filtering ambient sounds, including background noises, echoes, interference, or any combination thereof, from the received first audio signal responsive to determining that the audio playback device is located at a first location and maintaining the ambient sounds in the received first audio signal responsive to determining that the audio playback device is located at a second location different than the first location.

2. The method of claim 1, wherein the second audio signal includes sound associated with movies, music, games, far-end speech of a voice over IP (VoIP) call, or a combination thereof.

3. The method of claim 1, wherein the first audio signal includes speech associated with at least one speaker, and wherein the plurality of first audio processing operations comprises separating the speech associated with the at least one speaker from the second audio signal, speech associated with other speakers present with the at least one speaker, or a combination thereof.

4. The method of claim 1, wherein the first audio source is an audio input source and the second audio source is a loudspeaker of the audio playback device.

5. The method of claim 1, wherein the first audio application comprises a voice over IP (VoIP) application or an automatic speech recognition application.

6. The method of claim 1, wherein the second audio application comprises a video application, a music application, a game application, a voice over IP (VoIP) application, or a combination thereof.

7. The method of claim 1, wherein the plurality of first audio processing operations comprises detecting background noise in an environment associated with the first audio source.

8. The method of claim 7, wherein the environment is further associated with the second audio source, and wherein the plurality of second audio processing operations comprises detecting the background noise in the environment.

9. A system comprising:
an audio playback device comprising hardware and software audio resources;
a non-transitory memory storing machine-readable instructions for audio processing; and
one or more hardware processors coupled to the non-transitory memory and operable to read instructions from the non-transitory memory to cause the system to perform operations comprising:
receiving a first audio signal from a first audio source and a second audio signal from a second audio source, wherein the second audio source is included in the audio playback device and the first audio source is separate from the audio playback device;
determining a plurality of first audio processing operations associated with the first audio signal based at least in part on a first audio application configured to transmit the first audio signal;
determining a plurality of second audio processing operations associated with the second audio signal based at least in part on a second audio application configured to transmit the second audio signal, wherein the plurality of second audio processing operations is different than the plurality of first audio processing operations;
determining a geospatial location of the audio playback device;
modifying the second audio signal based on the plurality of first audio processing operations and the plurality of second audio processing operations; and
modifying the first audio signal, concurrently with the second audio signal, based at least in part on the plurality of first audio processing operations and the determined geospatial location of the audio playback device, wherein modifying the first audio signal comprises filtering ambient sounds, including background noises, echoes, interference, or any combination thereof, from the received first audio signal responsive to determining that the audio playback device is located at a first location and maintaining the ambient sounds in the received first audio signal responsive to determining that the audio playback device is located at a second location different than the first location.

10. The system of claim 9, wherein the second audio signal includes sound associated with movies, music, games, far-end speech of a voice over IP (VoIP) call, or a combination thereof.

11. The system of claim 9, wherein the first audio signal includes speech associated with at least one speaker, and wherein the plurality of first audio processing operations comprises separating the speech associated with the at least one speaker from the second audio signal, speech associated with other speakers present with the at least one speaker, or a combination thereof.

12. The system of claim 9, wherein the first audio application comprises a voice over IP (VoIP) application or an automatic speech recognition application.

13. The system of claim 9, wherein the second audio application comprises a video application, a music application, a game application, a voice over IP (VoIP) application, or a combination thereof.

* * * * *